US010837798B2

(12) United States Patent
Ebina et al.

(10) Patent No.: US 10,837,798 B2
(45) Date of Patent: Nov. 17, 2020

(54) STROKE SENSOR

(71) Applicant: NIPPON SEIKI CO., LTD., Niigata (JP)

(72) Inventors: Kota Ebina, Niigata (JP); Ryuji Yoshida, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 86 days.

(21) Appl. No.: 16/310,693

(22) PCT Filed: Jun. 22, 2017

(86) PCT No.: PCT/JP2017/022982
§ 371 (c)(1),
(2) Date: Dec. 17, 2018

(87) PCT Pub. No.: WO2018/003651
PCT Pub. Date: Jan. 4, 2018

(65) Prior Publication Data
US 2019/0265068 A1    Aug. 29, 2019

(30) Foreign Application Priority Data

Jun. 30, 2016    (JP) .................. 2016-131002

(51) Int. Cl.
*G01D 5/12* (2006.01)
*G01B 7/00* (2006.01)
*F16H 59/02* (2006.01)

(52) U.S. Cl.
CPC ............... *G01D 5/12* (2013.01); *F16H 59/02* (2013.01); *G01B 7/003* (2013.01)

(58) Field of Classification Search
CPC ........ G01D 5/12; G01D 5/142; G01D 11/245; G01B 7/003
See application file for complete search history.

(56) References Cited

U.S. PATENT DOCUMENTS

| 5,675,076 A | 10/1997 | Esch et al. |
| 8,240,196 B2* | 8/2012 | Park .................. B60T 7/042 |
| | | 73/121 |

(Continued)

FOREIGN PATENT DOCUMENTS

| JP | 2008-189218 A | 8/2008 |
| JP | 2012-78123 A | 4/2012 |

(Continued)

OTHER PUBLICATIONS

International Search Report dated Sep. 12, 2017, issued in corresponding International Application No. PCT/JP2017/022982, including English Translation.

*Primary Examiner* — Dominic E Hawkins
(74) *Attorney, Agent, or Firm* — McDermott Will & Emery LLP

(57) ABSTRACT

Provided is a stroke sensor that is easy to assemble and has a high detection precision. This stroke sensor is provided with: a housing; a shaft a portion of which is housed in the housing and moves reciprocally around an origin position following a detected object; and a magnetic detection element that detects a magnetic force that is from a magnet and that varies according to the amount of movement of the shaft, wherein the housing comprises a plurality of cases made of a metal material, and is provided with contact parts that guide the positional relationship between the cases before and after the cases are connected by screwing.

10 Claims, 5 Drawing Sheets

(56) References Cited

U.S. PATENT DOCUMENTS

| | | | | |
|---|---|---|---|---|
| 8,474,789 B2* | 7/2013 | Shimada | ............... | F16K 31/047 |
| | | | | 137/554 |
| 9,518,649 B2* | 12/2016 | Tanaka | ................... | F16H 59/02 |
| 2009/0249914 A1* | 10/2009 | Kashiwai | ................ | F16H 63/30 |
| | | | | 74/473.21 |
| 2015/0177025 A1* | 6/2015 | Mizunuma | ........... | G01D 11/245 |
| | | | | 324/207.25 |

FOREIGN PATENT DOCUMENTS

| | | |
|---|---|---|
| JP | 2012-112415 A | 6/2012 |
| JP | 2014-130035 A | 7/2014 |
| JP | 2015-125103 A | 7/2015 |
| JP | 2015-125106 A | 7/2015 |

* cited by examiner

STROKE SENSOR

CROSS REFERENCE

This application is the U.S. National Phase under 35 U.S.C. § 371 of International Application No. PCT/JP2017/022982, filed on Jun. 22, 2017, which claims the benefit of Japanese Application No. 2016-131002, filed on Jun. 30, 2016, the entire contents of each are hereby incorporated by reference.

TECHNICAL FIELD

The present invention relates to a stroke sensor.

BACKGROUND ART

An example of a stroke sensor configured to detect a movement amount of a moving body such as a lever of an automobile or a motorcycle includes that disclosed in Patent Document 1. The stroke sensor detects a movement amount of a shaft that follows a movement of an object to be detected and a magnet arranged on the shaft. A structure is disclosed in which a component such as a shaft is housed into a housing obtained by combining a plurality of cases.

PRIOR ART DOCUMENT

Patent Document

Patent Document 1: Japanese Unexamined Patent Application Publication No. 2015-125103

SUMMARY OF THE INVENTION

Problems to be Solved by the Invention

In the stroke sensor described in the above Patent Document 1, one of the cases is formed of synthetic resin. However, when the case is applied to a location such as where to receive a large temperature change, vibration, or the like and when a higher detection accuracy is required, a case made of metal materials with a small amount of thermal deformation or the like needs to be applied to the housing. Even in this case, a structure easy to assemble has been required.

Therefore, in view of the above problem, an object of the invention of the present application is to provide a stroke sensor which is easy to assemble and has a high detection accuracy.

Means for Solving the Problems

To achieve the above object, a stroke sensor according to the present invention includes:
  a housing;
  a shaft configured to reciprocate around an original position while following an object to be detected, wherein a part of the shaft is housed in the housing; and
  a magnetism detection element configured to detect a magnetic force from a magnet varying along with a movement amount of the shaft, wherein
    the housing is formed of a plurality of cases made of a metal material, and includes an abutting unit configured to guide a positional relationship of the cases before and after the cases being screwed to be coupled to each other.

Further, it is characterized in that each of the plurality of cases includes a sliding unit abutting the shaft.

Moreover, it is characterized in that in the housing, at ends where the plurality of cases face each other, a tapered face for guiding is provided at at least one of the ends.

Further, it is characterized in that in one case of the plurality of cases, a detection unit holding the magnetism detection element is provided, and in the other case, an origin returning means configured to return the shaft to the original position is housed.

Advantageous Effects of Invention

According to the present invention, a stroke sensor which is easy to assemble and has a high detection accuracy is provided.

DESCRIPTION OF THE EMBODIMENT

In an embodiment of the present invention, a movable component mounted on an automobile including an operation lever or a moving part of an accelerator pedal, a transmission, an intake throttle or the like is considered an object to be detected, and an embodiment applied to a stroke sensor configured to detect a movement amount or an operation amount of the object will be used as an example and described based on the attached drawings, below.

Figure 1:
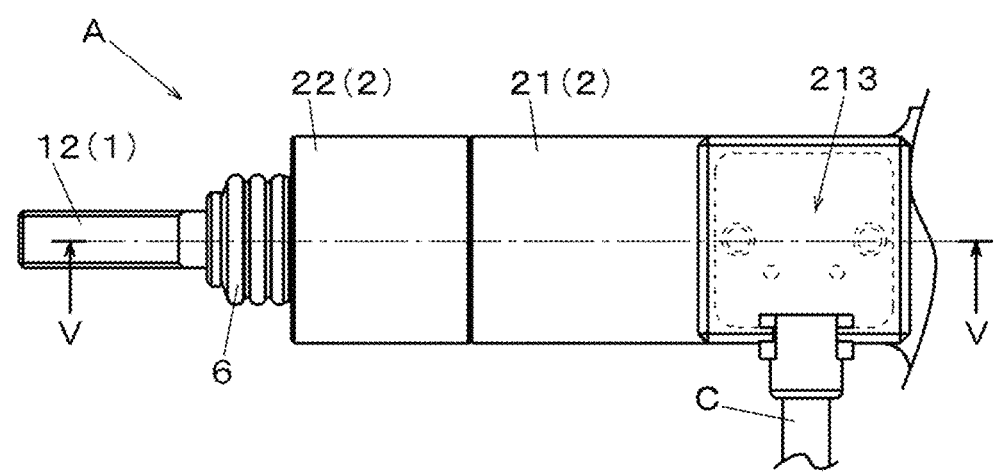
FIG. 1 is a plan view illustrating an embodiment of a stroke sensor of the present invention.
Figure 2:
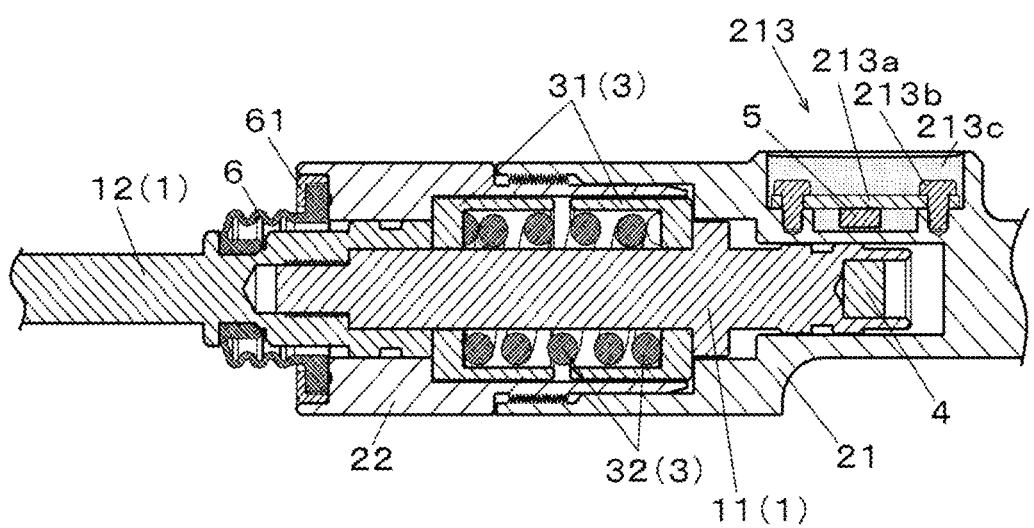
FIG. 2 is a cross-sectional view (cross-sectional view along line V-V of FIG. 1) of the stroke sensor according to the embodiment.

As illustrated in FIGS. 1 and 2, a stroke sensor A of the present invention is a stroke sensor A configured to detect a movement amount of a shaft 1 configured to reciprocate around an original position while following an object to be detected. The stroke sensor A includes a housing 2 configured to slidably support the shaft 1 while regulating a rotation of the shaft 1, and an origin returning mean 3 configured to return the moved shaft 1 to an original position by detecting a movement amount, the origin returning mean 3 being provided between the shaft 1 and the housing 2. The stroke sensor A is configured to include a magnet 4 arranged on the shaft 1, and a magnetism detection element 5 configured to detect a movement amount from a magnetic field change along the movement of the shaft 1 at a position facing the magnet 4 via the housing 2. Further, a packing 6 is assembled to prevent a foreign substance from entering between the shaft 1 and the housing 2.

The shaft 1 of the present embodiment is a detection medium configured to follow the movement of the object to be detected. For example, the shaft 1 is coupled to the object to be detected so that an external force is transmitted, and when following, the shaft 1 reciprocates in an axial direction (longitudinal direction).

Figure 3:
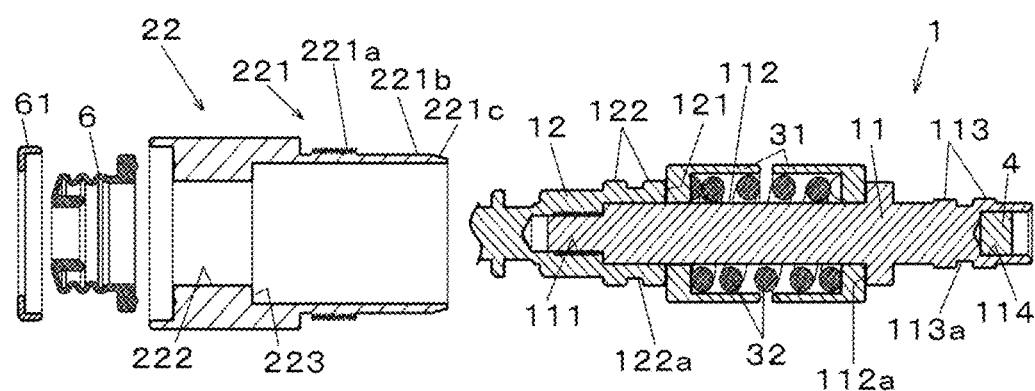
FIG. 3 is a cross-sectional view illustrating a second case, a shaft, and a packing according to the embodiment.

The shaft 1 includes a first shaft 11, and a second shaft 12, and the first shaft 11 and the second shaft 12 are coupled by a screw. It is noted that as illustrated in FIG. 3, the shaft 1 is combined with the origin returning mean 3 to form a unit and is then assembled into a second case 22.

The first shaft 11 is made of a nonmagnetic metal having a certain degree of rigidity, and is made of austenitic stainless steel (SUS; Steel Use Stainless) as a typical example. The first shaft 11 includes a coupling unit 111, a holding unit 112, a sliding unit 113, and a housing unit 114.

The coupling unit 111 has a screw thread formed at one end side of the first shaft 11 to enable coupling with the second shaft 12.

The holding unit 112 can slidably hold the origin returning mean 3 including a piston 31 and a spring 32. The origin returning mean 3 is held to be sandwiched in an axial direction by an end face 121 of the coupled second shaft 12 and an end face 112a opposite the end face 121. The end faces 121, 112a contact the piston 31 of the origin returning mean 3 described later, and when the shaft 1 is pushed, a pushing force is transmitted to the piston 31. As a result, a power of resistance is generated by the spring 32 via the piston 31 to enable returning of the shaft 1 to the original position.

The sliding unit 113 is formed at the side of the other end (opposite side of the coupling unit 111) of the first shaft 11 and slides while abutting an inner wall surface inside the housing (first case 21) 2. Further, the sliding unit 113 is axially supported accurately by the housing 2 and is formed not into a cylinder but into a rotation stoppable shape. As a result, it is possible to suppress as much as possible an eccentricity of the shaft 1 due to a load of the spring 32 applied to the end faces 121,112a. Further, the sliding unit 113 is formed with a groove 113a to enable retaining a lubricant. It is noted that a cut-out face obtained by cutting a side of the first shaft 11 into a flat shape is formed to form a traverse sectional shape into a substantial D shape, and an inner wall of the housing (first case 21) 2 is abutted against the cut-out face, which would be sufficient to obtain a rotation stoppable shape. In the stroke sensor A, this rotation stopper prevents rotation of the magnet 4 along with the shaft 1, and thus, an orientation into which the magnet 4 faces the magnetism detection element 5 can be kept constant and a magnetic change can be exactly detected.

The housing unit 114 is a recessed part formed at an end face at the other end side of the first shaft 11, and the magnet 4 is pressed into the housing unit 114 to be held. In this case, because of its rotation stoppable shape, the magnet 4 is held to not shift its position, and further with the use of an adhesive, is firmly fixed.

The second shaft 12 is coupled to the first shaft 11, and a part of the second shaft 12 is housed in the housing (second case 22) 2. For the second shaft 12, a metal material is used, for example. The second shaft 12 is preferably made of a non-magnetic material, similarly to the first shaft 11; however, the second shaft 12 keeps a certain distance to the magnet 4 or the magnetism detection element 5, and thus, even if the second shaft 12 is made of a soft magnetic material such as a steel, an influence to a magnetic field is small and a material can be appropriately selected in view of a cost and a strength.

The second shaft 12 is coupled threadably to the coupling unit 111 of the first shaft 11 through which the origin returning mean 3 is passed, and in coupling, the screw is prevented from loosening by a reinforcement adhesive (such as a seal lock agent) or the like. Further, the second shaft 12 includes a sliding unit 122 similar to the sliding unit 113 of the first shaft 11, and slides in contact with the inner wall of the housing (second case 22) 2. Further, similarly to the groove 113a, the sliding unit 122 includes a groove 122a where a lubricant is restrained. It is noted that, in this case, the second shaft 12 is not subject to a process for stopping a rotation with respect to the housing 2.

The housing 2 includes a first case 21 configured to slidingly house the first shaft 11, and a second case 22 configured to slidingly house the second shaft 12, as a separate body.

Figure 4:
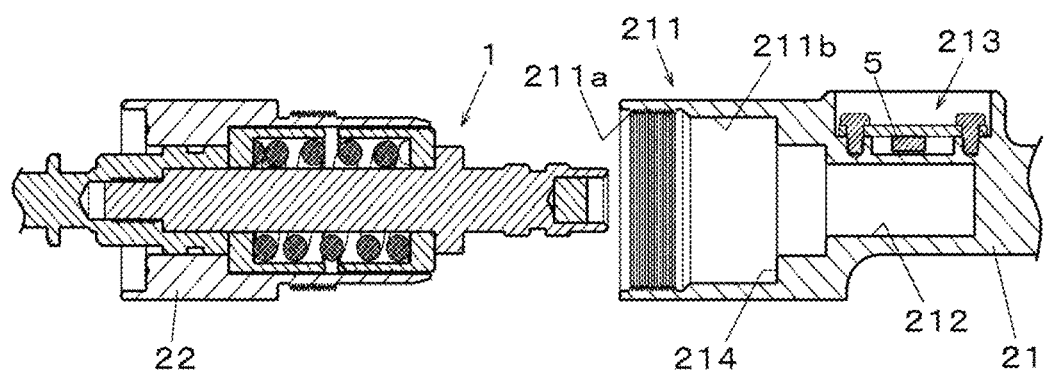
FIG. 4 is a cross-sectional view illustrating the stroke sensor before a first case is assembled, according to the embodiment.

The first case 21 is made of a non-magnetic material and is formed in a substantially cylindrical shape, and for example, for the first case 21, a metal material such as aluminum and stainless steel, or PBT (Poly Butylene Terephthalate) is used. As illustrated in FIG. 4, the first case 21 is formed like a cap, and includes a coupling means 211, a sliding face 212, and a housing means (detection unit) 213.

Figure 5:
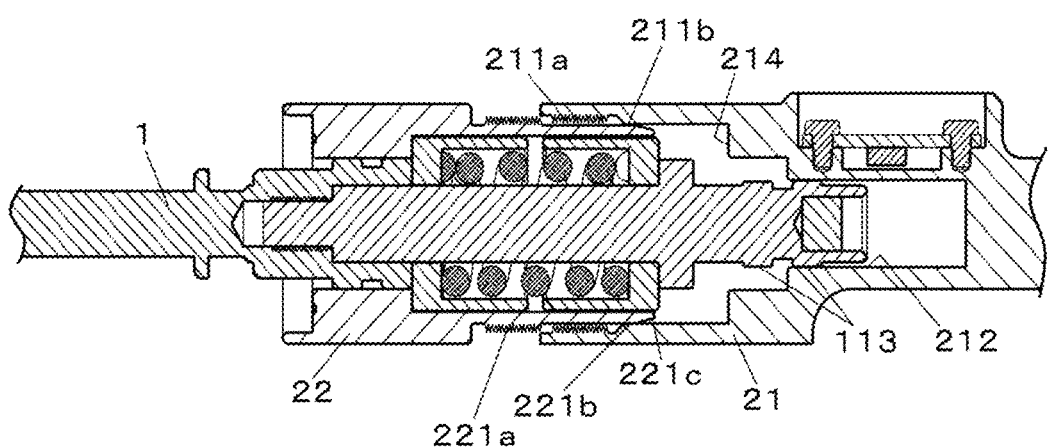
FIG. 5 is a cross-sectional view illustrating the stroke sensor after the first case is assembled, according to the embodiment.

The coupling means 211 is formed in coupling with the second case 22, and includes a screw unit 211a having a screw thread so that the coupling means 211 and the second case 22 are screwed together, and as illustrated in FIG. 5, an abutting unit 211b configured to guide the second case 22 through abutting the second case 22 before the screw unit 211a is screwed when being fitted to the first case 21. In this case, the screw unit 211a and the abutting unit 21b are formed at an inner wall side of the first case 21.

The abutting unit 211b is in an axially aligned state to be coaxial with the second case 22 in an assembled state of FIG. 5, and thus, the screw unit 211a can be screwed from a correct direction, resulting in an easy assembly. Further, after the first case 21 and the second case 22 are assembled, the abutting state can be also continued, and thus, it is possible to increase the rigidity of the housing 2.

Further, the screw unit 211a is arranged outside the abutting unit 211b, and an external influence does not easily reach the abutting unit 211b being inside the screw unit 211a, and thus, it is possible to prevent attachment of a foreign matter, corrosion or the like and it is also possible to maintain the coaxial state. Further, when a reinforcement adhesive (such as a seal lock agent) is used in coupling, it is possible to enhance this effect.

The sliding face 212 is formed on the inner wall at the inner side of the coupling means 211 in a housing space for the shaft 1, and abuts against the sliding unit 113 formed on the side wall of the first shaft 11 to axially support the shaft 1 in a slidable manner. Further, the sliding face 212 is formed in a substantially D-shaped traverse sectional face contacting the outer surface of the cut-out face of the first shaft 11, and also stops a rotation of the shaft 1. Therefore, it is possible to maintain a distance accuracy between the magnet 4 and the magnetism detection element 5 constant to increase a detection accuracy.

A housing means 213 can hold the magnetism detection element 5 in the vicinity of the magnet 4. In this case, the housing means 213 mounts the magnetism detection element 5, and is held by using a screw 213b inside the recessed housing means 213 by assembling a printed wiring board 213a to be externally connected via a cable C from outside the first case 21. Further, the housing means 213 is provided with a filling member 213c configured to make a connection location with the printed wiring board 213a or the cable C airtight.

Further, the first case 21 includes an end face 214 defining a position in an axial direction of the shaft 1, and when abutting the piston 31, movement of the shaft 1 is regulated.

For the second case 22, a metal material is used, for example. The second case 22 is preferably made of a non-magnetic material, similarly to the first case 21; however, there is a certain distance to be maintained to the magnet 4 or the magnetism detection element 5, and thus, even if the second shaft 12 is made of a soft magnetic material such as a steel, an influence to a magnetic field is small and a material can be appropriately selected in view of a cost and a strength.

In the second case 22, a coupling means 221 corresponding in shape to the coupling means of the first case 21 is formed. In this case, in the coupling means 221, as illustrated in FIG. 3, the screw unit 221*a* and the abutting unit 221*b* formed outside the second case 22 are arranged to correspond to the screw unit 211*a* and the abutting unit 211*b* of the coupling means 211 of the first case 21.

Further, in the coupling means 221, at a tip side of a face facing the first case 21, a tapered face 221*c* is formed for guiding the abutting unit 211*b* to a predetermined position for abutting against the abutting unit 221*b* of the second case 22. With this tapered face 221*c*, the abutting units 221*b*, 211*b* while not visible as a result of being covered by the screw unit 211*a* of the first case 21 can easily make a contact. Therefore, if the screw unit 211*a* is formed at an opening end side relative to the abutting unit 211*b*, and further, even if a clearance between the abutting units 221*b* and 211*b* is very small, an abutting state (axial alignment) between the first case 21 and the second case 22 can be easily introduced, and thus, the assembly is easy.

It is noted that before a state of assembly in FIG. 5 is reached from FIG. 4, the sliding unit 113 of the first shaft 11 and the sliding face 212 of the first case 21 abut against each other, and thus, the housings 2 can be threadedly connected without being aware of the state of assembly in this location.

Further, in the second case 22, similarly to the first case 21, a sliding face 222 and an end face 223 are formed. The sliding face 222 is formed on an inner wall of the cylindrical second case 22, and abuts against the sliding unit 122 formed on a side wall of the second shaft 12 to axially support the shaft 1 in a slidable manner. Further, when the end face 223 abuts against the piston 31, the movement of the shaft 1 is regulated.

The origin returning mean 3 is configured by a pair of pistons 31, 31, and a spring 32 being mounted between the pistons 31 and configured to urge the pistons 31 away from each other. For the two pistons 31, a metal material is used, for example. The two pistons 31 are preferably made of a non-magnetic material; however, there is a certain distance to be maintained to the magnet 4, and thus, even if the two pistons 31 are made of a soft magnetic material such as a steel, an influence to a magnetic field is small and a material can be appropriately selected in view of a durability and a strength.

In the two pistons 31, a mounting hole for being mounted in the holding unit 112 of the first shaft 11 is formed at the center of a bottom portion formed in a bottomed cylindrically shape. The two pistons 31 face each other with the bottom portion facing outside, mounted slidably to the holding unit 112 of the first shaft 11, includes the spring 32 configured by coil springs interposed between the two pistons 31, and is mounted to the first shaft 11.

When the first case 21 and the second case 22 are coupled to be formed, the two pistons 31 are arranged between the end faces 214 and 223. It is noted that the two pistons 31 are arranged to have a clearance with respect to the inner wall surface of the housing (second case 22) 2, and even if an operational task during the assembly of the shaft 1 into the housing (second case 22) 2 and a large load are applied after being mounted on a vehicle, a stress is applied to the shaft 1, this clearance makes it difficult for the two pistons 31 to contact the inner wall surface of the housing 2. As a result, it is possible to prevent a factor applying an influence to an operation feeling such as damage on the spring 32, the two pistons 31, and the inner wall surface.

For the spring 32, a coil spring made of a stainless steel such as a non-magnetic metal such as SUS304WPB is preferably used; however, there is a distance to the magnet 4, and thus, even if the spring 32 is made of a soft magnetic material (such as SWB and SWC), an influence to a magnetic field is small and a material may be appropriately selected in view of a durability and a strength. In this case, the spring 32 is made of a silicon chrome steel oil tempered wire, and its surface is subject to passivation by cationic electrodeposition coating. Further, a predetermined amount of grease is applied from an outer periphery of the spring 32, and the grease is spread to an inner periphery of the spring 32. With the grease, prevention of vibration and a lubrication effect are possible, and in addition, it is possible to prevent corrosion of the spring 32 or the like even with a relatively less expensive anti-corrosion process. Also, irrespective of where the shaft 1 is located, it is possible to press, by the spring 32, the two pistons 31 against the end faces 214, 223 and the end faces 112*a*, 121, and thus, it is possible to hold, without vibration, the two pistons 31 even having a clearance against the inner wall surface. Therefore, it is possible to provide a constant operational feeling to a stroke of the shaft 1. Further, when the vibration of the two pistons 31 is prevented, it is possible to stabilize the detection accuracy by the magnetism detection element 5.

In the two pistons 31 of the origin returning mean 3, at the original position, as illustrated in FIG. 2, when the piston 31*a* abuts against the end faces 214, 223 of the housing 2 and the end faces 112*a*, 121 of the shaft 1, a clearance between the two pistons 31 is regulated. Then, the clearance (interval) of a cylindrical portion between the two pistons 31 and 31 in this state (at the original position) is a detection stroke of the shaft 1.

In the origin returning mean 3, when the shaft 1 at the original position is displaced to be pushed into the housing 2, the piston 31 moves away from the end face 223 of the housing (second case 22) 2 and the end face 112*a* of the shaft (first shaft 11) 1 while abutting against the end face 214 of the housing (first case 21) 2 and the end face 121 of the shaft (second shaft 12) to enable movement by the detection stroke until the cylindrical portions of the two pistons 31 are contacted against the spring 32. Then, when there is no more force to push the shaft 1, the spring force accumulated in the spring 32 returns the shaft 1 to the original position.

Further, in the origin returning mean 3, when the shaft 1 at the original position is displaced to be pulled out from the housing 2, the piston 31 moves away from the end face 214 of the housing (first case 21) 2 and the end face 121 of the shaft (second shaft 12) 1 while abutting against the end face 223 of the housing (second case 22) 2 and the end face 112*a* of the shaft (first shaft 11) to enable movement by the detection stroke until the cylindrical portions of the two pistons 31 are contacted against the spring 32. Then, when there is no more force to push the shaft 1, the spring force accumulated in the spring 32 returns the shaft 1 to the original position. It is noted that in the piston housing unit where the piston 31 is housed, a lubricant such as grease is spread even on an outer peripheral surface of the piston 31, and thus, a long-term stable sliding can be secured to the first shaft 11.

The magnet 4 is configured by a rare earth magnet (for example, a magnet made of a material such as SmCo and NdFeB) formed into a rectangular prism shape or a cylindrical shape. In the present embodiment, the magnet 4 is of cylindrical shape using an SmCo sintered magnet, in which two poles are magnetized in an axial direction (longitudinal direction) of the shaft 1. The magnet 4 is housed in the housing unit 114 of the first shaft 11 of the shaft 1, and is fixed with an adhesive or the like.

The magnet 4 provides a magnetic field to the magnetism detection element 5 facing the magnet 4 of the first case 21, and when the magnet 4 is displaced along with the shaft 1, an orientation of the magnetic field (magnetic force) applied to the magnetism detection element 5 is changed, and as a result, the magnetism detection element 5 detects this change as a movement amount. The magnet 4 may be any magnet such as a sintered magnet or a compressed or molded plastic magnet obtained by mixing a plastic, depending on a manufacture technique. While the sintered magnet has a stronger magnetic force, the plastic magnet has a characteristic such as a higher mass productivity and crack resistance. Thus, the magnet may be appropriately selected depending on a use condition and a design requirement.

The magnetism detection element 5 detects a displacement such as a movement amount of the object to be detected, is configured by a hall element, for example, and converts the change in the magnetic force associated with the displacement such as a movement of the object to be detected into an electric signal and outputs the same to outside. For example, the magnetism detection element 5 is configured as a magnetism detection package in which a plurality of hall elements are mounted on a circuit board.

Here, a detection face of the magnetism detection element 5 is oriented in a direction perpendicular to a magnetizing direction of the magnet 4. The magnetism detection package including the magnetism detection element 5 is mounted on a face at a magnet 4 side of the printed wiring board 213*a*, is housed in the housing means 213 of the housing 2 (first case 21), and after being temporarily fixed with a positioning pin or a screw 213*b*, is airtightly sealed with a potting agent (filling member). Further, the magnetism detection package may be airtightly held by a packing or a lid (not illustrated). In this way, the present invention is designed so that the magnetic field change can be highly accurately detected while minimizing a gap with the magnet 4 as much as possible.

Supplying a power supply to the magnetism detection element 5 and output therefrom to outside are performed by way of a direct connector or a code. It is noted that the magnetism detection element 5 may be mounted on a wire frame or the like to be configured as a magnetism detection package.

During detection of a stroke by using the magnetism detection element 5 described above, a plurality of hall elements are used to detect magnetic fields vertical and horizontal to a magnetism detection face of the magnetism detection element 5, of the magnetic field formed by the magnet 4. By using a processing circuit (for example, ASIC: Application Specific Integrated Circuit), the magnetic fields in the two directions, that is, vertical and horizontal magnetic fields, are subject to a trigonometric function (ATAN) to obtain an angle conversion, and the result is output as angle information. It is noted that the output angle information and the movement amount (stroke) of the shaft 1 are proportional, and as a result, it is possible to detect the movement amount of the shaft 1.

Further, an output scheme from the magnetism detection package including the magnetism detection element 5 may be arbitrary, and may be selected (for example, analog, PWM (Pulse Width Modulation), or SENT (Single Edge Nibble Transmission)) according to a control unit (ECU: Engine Control Unit) or the like utilizing a detection result.

For the packing 6, a cylindrical rubber packing with bellows configured to close a gap between the shaft (second shaft 12) 1 and the housing (second case 22) 2 may be employed. In the packing 6, an opening at one end of the packing 6 is fitted into the shaft 1 and in an opening at the other end, another metal member 61 is pressed and held into the housing 2. In this way, an opening end of the packing 6 is fixedly clamped. Further, the intermediate bellows portion of the packing 6 ensures to keep the interior of the housing 2 airtight while absorbing the displacement of the stroke amount. It is noted that in the packing 6, the second shaft 12 rotates relative to the second case 22 by a screw-connection between the housings 2, and thus, the packing 6 is preferably assembled after the screw-connection.

According to such a stroke sensor A, the present invention is a stroke sensor A including the housing 2, the shaft 1 configured to reciprocate around an original position while following an object to be detected, where a part of the shaft 1 is housed in the housing 2, the magnet 4 arranged on the shaft 1, and the magnetism detection element 5 configured to detect a magnetic force from the magnet 4 varying along with a movement amount of the shaft 1. The housing 2 is formed of a plurality of cases 21, 22 made of a metal material, and before and after the cases being screwed to be coupled with each other, the abutting units 211*b*, 221*b* is provided which is configured to guide a positional relationship of the cases 21, 22.

Therefore, the housings 2 are easily assembled by the guiding of the abutting units 211*b*, 221*b*, and further, even after the assembly, by the abutting units 211*b*, 221*b* arranged in addition to the screwed location (screw units 211*a*, 221*a*), it is possible to highly maintain the axial accuracy of the housing 2. As a result, it is possible to establish a desired distance between the magnet 4 and the magnetism detection element 5 to obtain a stroke sensor with a high detection accuracy. Further, the stroke sensor A has a high axial accuracy, and thus, the shaft 1 can smoothly move. As a result, it is possible to prevent a wasted friction and unstable operational feeling.

Further, when the sliding units 113, 122 abutting against the shaft 1 are provided, the plurality of cases 21, 22 can provide a highly accurate stroke detection where the axial shift of the shaft 1 is less likely to occur relative to the housing 2.

Further, in the housing 2, at ends where the plurality of cases 21, 22 face each other, a tapered face 221*c* for guiding is provided at least at one end thereof.

As a result, even if the dimensional accuracy is high and the clearance between the abutting units 211*b* and 221*b* is small, it is possible to obtain the housing 2 easy to assemble.

Further, when one case 21 of the plurality of cases 21, 22 includes the housing means 213 configured to hold the magnetism detection element 5, and the other case 22 houses the origin returning mean 3 configured to return the shaft 1 to the original position, even if a metal made of magnetic body is applied to the piston 31 and the spring 32, it is possible to reduce the influence to the magnetic detection area including the magnet 4 and the magnetism detection element 5 to obtain the stroke sensor A with a high detection accuracy and a large material selection range.

It is noted that the stroke sensor of the present invention is described by using the configuration of the above-described embodiment as an example, but the present invention is not limited thereto, and it is needless to say that even in another configuration, the present invention may be variously modified and a display thereof may be changed as long as it does not depart from the spirit of the present invention. For example, regarding the screwing relationship between the housings 2, a relationship between a male thread and a female thread may be different from the above-described embodiment.

Further, although the structure where the magnet 4 is held on the shaft 1 is illustrated; however, a configuration may be adopted where a change in a so-called bias magnetic field is detected, the bias magnetic field being generated by applying a magnetic body to the moving shaft 1, and providing a magnet at a rear face side (opposite side of the detection face) of the magnetism detection element, and similarly to the above-described embodiment, the movement amount of the shaft 1 (magnetic body) can be highly accurately detected.

INDUSTRIAL APPLICABILITY

The present invention relates to a stroke sensor, and is suitable for a stroke sensor configured to detect a movement amount of a movable component mounted on a vehicle vibrating due to vehicle traveling or the like.

REFERENCE SIGNS LIST

A Stroke sensor
10 Shaft unit
1 Shaft
11 First shaft
111 Coupling unit
112 Holding unit
112a End face
113 Sliding unit
113a Groove
114 Housing unit
12 Second shaft
121 End face
122 Sliding unit
122a Groove
2 Housing
21 First case
211 Coupling means
211a Screw unit
211b Abutting unit
212 Sliding face
213 Housing means (detection unit)
213a Printed wiring board
213b Screw
213c Filling member
214 End face
22 Second case
221 Coupling means
221a Screw unit
221b Abutting unit
221c Tapered face
222 Sliding face
223 End face
3 Origin returning means
31 Piston
32 Spring
4 Magnet
5 Magnetism detection element
6 Packing

The invention claimed is:

1. A stroke sensor, comprising:
a shaft configured to reciprocate around an original position while following an object to be detected, wherein the shaft includes a first end and a second end opposite the first end;
a magnetism detection element configured to detect a magnetic force from a magnet varying along with a movement amount of the shaft; and
a housing configured to house the shaft,
wherein the housing is made of a metal material,
wherein the housing is formed of a first case and a second case,
wherein the first case comprises:
a first end including a first opening; and
a second end opposite the first end,
wherein the second case comprises:
a first end including a first opening; and
a second end opposite the first end, the second end including a second opening,
wherein the first end of the first case and the second end of the second case are coupled with each other through a screw thread to form the housing, and
wherein when the shaft is housed in the housing, 1) the first end of the shaft extends out of the first opening of the second case and 2) the second end of the shaft is accommodated in the first case.

2. The stroke sensor according to claim 1,
wherein the shaft includes 1) a first sliding unit at a first portion of the shaft and 2) a second sliding unit at a second portion of the shaft, and
wherein when the shaft is housed in the housing, 1) the first sliding unit of the shaft abuts a first sliding face disposed in an inner surface of the first case, and 2) the second sliding unit of the shaft abuts a second sliding face disposed in an inner surface of the second case.

3. The stroke sensor according to claim 1, wherein the second case comprises an outer surface that tapers toward the second opening of the second case.

4. The stroke sensor according to claim 1, wherein the first case comprises an outer surface including a portion that holds the magnetism detection element.

5. The stroke sensor according to claim 1, further comprising an origin returning mechanism configured to return a displaced shaft to an original position,
wherein the origin returning mechanism is disposed between an outer surface of the shaft and an inner surface of the second case.

6. The stroke sensor according to claim 1,
wherein the screw thread includes a first screw thread and a second screw thread that correspond to each other,
wherein the first case comprises the first screw thread on an inner surface of the first case,
wherein the second case comprises the second screw thread on an outer surface of the second case, and
wherein when the first case and the second case are coupled to each other, a portion of the second case is inserted in the first case such that the first screw thread on the inner surface of the first case engages with the second screw thread on the outer surface of the second case.

7. The stroke sensor according to claim 6,
wherein the first case comprises a first abutting portion on the inner surface of the first case,
wherein the first abutting portion of the first case is disposed farther away from the first opening of the first case than the first screw thread of the first case, wherein the second case comprises a second abutting portion on the outer surface of the second case, wherein the second abutting portion of the second case is disposed closer to the second opening of the second case than the second screw thread of the second case, and wherein when the first case and the second case are coupled to each other, the first abutting portion of the first case and the second abutting portion of the second case abut each other.

8. The stroke sensor according to claim 7, wherein while the portion of the second case is being inserted into the first case, the second abutting portion first abuts the first screw thread of the first case and then abuts the first abutting portion of the first case to align the first screw thread of the first case and the second screw thread of the second case.

9. A stroke sensor comprising:
a shaft configured to reciprocate around an original position while following an object to be detected;
a magnetism detection element configured to detect a magnetic force from a magnet varying along with a movement amount of the shaft; and
a housing configured to house a part of the shaft,
wherein the housing is made of a metal material,
wherein the housing is formed of a first case and a second case,
wherein the first case comprises:
a first end including a first opening;
a second end opposite the first end,
wherein the second case comprises:
a first end; and
a second end opposite the first end, the second end including a second opening,
wherein the first end of the first case and the second end of the second case are coupled with each other through a screw thread to form the housing, wherein the screw thread includes a first screw thread and a second screw thread that correspond to each other, the first screw thread being disposed on an inner surface of the first case, the second screw thread being disposed on an outer surface of the second case, wherein the first case comprises a first abutting portion on the inner surface of the first case, the first abutting portion being disposed farther away from the first opening of the first case than the first screw thread of the first case, wherein the second case comprises a second abutting portion on the outer surface of the second case, the second abutting portion being disposed closer to the second opening of the second case than the second screw thread of the second case, and wherein when the first case and the second case are coupled to each other, the first abutting portion of the first case abuts the second abutting portion of the second case.

10. The stroke sensor according to claim 9,
wherein when the first case and the second case are coupled to each other, a portion of the second case is inserted in the first case such that the first screw thread on the inner surface of the first case engages with the second screw thread on the outer surface of the second case, and wherein while the portion of the second case is being inserted into the first case, the second abutting portion first abuts the first screw thread of the first case and then abuts the first abutting portion of the first case to align the first screw thread of the first case and the second screw thread of the second case.

* * * * *